United States Patent
Kalopissis et al.

[11] 3,891,385
[45] June 24, 1975

[54] HAIR SOFTENING DYE COMPOSITIONS CONTAINING SURFACE-ACTIVE ASPARAGINE DERIVATIVES

[75] Inventors: Gregoire Kalopissis; Andre Viout, both of Paris; Guy Vanlerberghe, Montjay-la-Tour, all of France

[73] Assignee: Societe Anonyne dite: L'Oreal, Paris, France

[22] Filed: Sept. 6, 1972

[21] Appl. No.: 286,698

Related U.S. Application Data

[60] Division of Ser. No. 12,477, Feb. 12, 1970, which is a continuation-in-part of Ser. No. 424,846, Jan. 11, 1965, Pat. No. 3,534,032.

[52] U.S. Cl. .............................. 8/10.1; 8/10; 8/85; 8/87; 424/70
[51] Int. Cl. .............................................. A61k 7/12
[58] Field of Search .................... 8/10.1, 10, 85, 87; 424/70

[56] References Cited
UNITED STATES PATENTS

| | | | |
|---|---|---|---|
| 2,821,521 | 1/1958 | Price | 260/534 X |
| 3,098,794 | 7/1963 | Dohr et al. | 8/10.1 |
| 3,303,213 | 2/1967 | Kalopissis et al. | 260/534 |
| 3,331,781 | 7/1967 | Kalopissis et al. | 252/152 |
| 3,534,032 | 10/1970 | Kalopissis et al. | 260/247.2 |

FOREIGN PATENTS OR APPLICATIONS
1,344,212  10/1963  France

Primary Examiner—Stanley J. Friedman
Assistant Examiner—Vera C. Clarke
Attorney, Agent, or Firm—Brisebois & Kruger

[57] ABSTRACT

Hair dye compositions which contain a surface-active compound having the formula

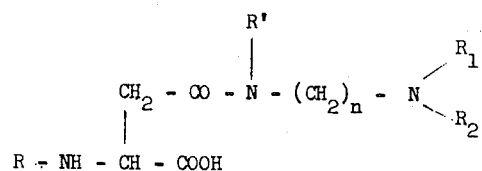

in which R and R' are an alkyl or alkenyl group which has 10–18 carbon atoms, $R_1$ and $R_2$ are lower alkyl or with the N atom a morpholino group and $n$ is 2–5 and a hair dye.

3 Claims, No Drawings

HAIR SOFTENING DYE COMPOSITIONS CONTAINING SURFACE-ACTIVE ASPARAGINE DERIVATIVES

This application is a division of application Ser. No. 12,477, filed Feb. 12, 1970 which in turn is a continuation-in-part of application Ser. No. 424,846 filed Jan. 11, 1965, which is now U.S. Pat. No. 3,534,032.

This invention relates to compositions which contain new asparagine derivatives having surface-active properties.

U.S. Pat. Nos. 3,303,213 and 3,331,781 describe and claim asparagine derivatives having very interesting surface-active properties, which are of particular use in hair shampoos. We have now found that certain related asparagine derivatives not only show surface activity, but possess other properties which are of considerable interest in relation to the treatment of hair.

The asparagine derivatives used in the compositions of this invention are compounds having the formula:

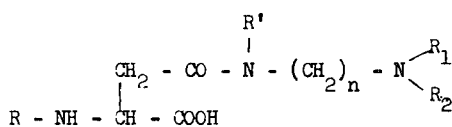

where R and R' are each an alkyl or alkenyl group which has 10–18 carbon atoms which can be the same or different; $R_1$ and $R_2$ are each lower alkyl, which can be the same or different, or together with the nitrogen atom to which they are attached constitute a morpholino residue and $n$ is an integer of 2–5 inclusive (especially 2 or 3), and sodium, potassium, ammonium and acid addition salts, such as lactate, phosphate, citrate and acetate salts thereof. Preferred compounds are those in which $R_1$ and $R_2$ are alkyl groups having 1–4 carbon atoms, for instance methyl or ethyl.

These compounds possess not only remarkable detergent properties, but also good softening and conditioning properties for the hair. Thus they can be used to advantage in hair shampoo or hair dyeing compositions.

Moreover, in acidic aqueous solutions these compounds show a very pronounced thickening and gelling effect. Since products currently employed as thickeners or gelling agents generally do not possess in themselves any detergent or hair treating property, it will be seen that compounds of the invention are particularly advantageous and because of this combination of properties they have a very wide range of use, for example, in aqueous solutions which may contain other surface-active substances, especially those of cationic or nonionic character, and in aqueous solutions of dyes.

The compounds of the invention can be prepared by a process which comprises condensing maleic anhydride with an alkylene diamine having the formula:

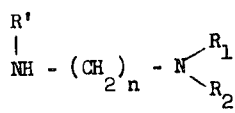

where R', $R_1$ and $R_2$ and $n$ have the meanings given above, modifying the reaction product to obtain the corresponding sodium, potassium or ammonium salt, and reacting said salt with a primary fatty amine of the formula:

R — $NH_2$ where R has the meaning given above.

Preferred alkylene diamines are, for example,
N-dodecyl-N',N'-diethylethylenediamine,
N-cetyl-N',N'-diethylethylenediamine,
N-dodecyl-N',N'-diethyltrimethylenediamine, and
β-(dodecylamino)ethylmorpholine.

Preferred primary fatty amines are, for example, decylamine and dodecylamine. It has been found that excellent results have been obtained using as primary amine a mixture of fatty amines derived from the copra acid or tallow acid, which yield a mixture of compounds of formula (1) differing only in the value of the substituent R, the various R substitutents being the various alkyl radicals present in tallow or copra acids respectively.

The invention is illustrated by the following Examples.

EXAMPLE I

Preparation of the sodium salt of $N^2$-[alkyl(tallow)]-N-(dodecyl)-N-(N',N'-diethylaminoethyl)asparagine.

1. Preparation of N'N'-diethyl-N-dodecyl-ethylenediamine

There are mixed with stirring 2 moles of dodecyl bromide and 10 moles of N',N'-diethylethylenediamine (96.6%) the temperature being maintained below 50°C. At the end of several hours, the reaction is complete. There are then added 4.3 moles of potassium hydroxide in pellet form, with vigorous stirring. The excess of potassium hydroxide and the potassium bromide formed are separated by filtration. The excess of N',N'-diethylethylenediamine is thereafter evaporated under reduced pressure, and the crude product thus obtained is washed with water and dried in vacuo on the water bath.

N',N'-diethyl-N-dodecyl-ethylenediamine is thus isolated in an almost quantitative yield and in a purity of 98 percent.

2. Preparation of N-dodecyl-N-(N',N'-diethylaminoethyl)maleamic acid.

One mole of N',N'-diethyl-N-dodecyl-ethylenediamine is dissolved in 300 ml of ethyl acetate.

To this solution is added with stirring, in an hour and a half, 1 mole of maleic anhydride in solution in 300 ml of ethyl acetate, the temperature being maintained between 35° and 40°C. The solid which precipitates is separated, washed with ethyl acetate and dried in vacuo, and N-dodecyl-N(N',N'-diethylaminoethyl)-maleamic acid is isolated as a white, water-soluble powder in a yield of 80 percent.

3. Addition of the primary amine derived from tallow fatty acids.

0.7 mole of N-dodecyl-N-(N',N'-diethylaminoethyl) maleamic acid is dissolved in 300 ml of ethyl alcohol, and the solution is neutralized with a calculated quantity of concentrated aqueous sodium hydroxide solution.

There is then added 0.7 mole of a mixture of primary amines derived from tallow fatty acids, and the mixture is heated at 65°C, for 11 hours. After evaporation of the alcohol, the product obtained takes the form of an oil dispersible in water, which contains 4 percent of unreacted primary amine.

EXAMPLE II

Preparation of the sodium salt of N²-[alkyl(copra)]-N-(cetyl)-N-(N',N'-diethylaminoethyl)asparagine.

By proceeding in an analogous to Example I, N-cetyl-N-(N',N'-diethylaminoethyl)maleamic acid is obtained from N',N'-diethyl-N-cetyl-ethylenediamine and maleic anhydride. The desired product is obtained by the addition to the sodium salt of the maleamic acid of a mixture of primary amines derived from copra fatty acids in an analogous way to Example I.

EXAMPLE III

Preparation of the sodium salt of N²-[alkyl(tallow)]-N-(cetyl)-N-(N',N'-diethyllaminoethyl)asparagine.

By the process analogous to that described in Example I, this product is obtained by the addition of a mixture of primary amines derived from tallow fatty acids to sodium N-cetyl-N-(N',N'-diethylaminoethyl)maleamate.

EXAMPLE IV

Preparation of the sodium salt of N²-[alkyl(copra)]-N-(dodecyl)-N-(N',N'-diethylaminoethyl)asparagine This product is obtained by reacting the mixture of primary amines derived from copra fatty acids with sodium N-dodecyl-N-(N',N'-diethylaminoethyl)maleamate in a process analogous to that described in Example I.

EXAMPLE V

Preparation of the sodium salt of N²-[alkyl(tallow)]-N-(dodecyl)-N-(morpholinoethyl)asparagine.

By a process analogous to that described in Example I, there is obtained from dodecyl bromide and aminoethylmorpholine, β-(dodecylamino)ethylmorpholine.

The condensation of this diamine with maleic anhydride gives the corresponding maleamic acid which, after neutralization with sodium hydroxide, is reacted with the mixture of primary amines derived from tallow fatty acids yielding the desired product in the form of an oil.

EXAMPLE VI

Preparation of the potassium salt of N²-[alkyl(tallow)]-N-(dodecyl)-N(N',N'-diethylaminopropyl)asparagine.

N',N'-diethyl-N-dodecyl-trimethylenediamine is first prepared by a process analogous to that described in Example I. Maleic anhydride is reacted with this diamine in solution in t-butyl alcohol. The maleamic acid thus formed in neutralisted by an aqueous potassium hydroxide solution, and the potassium salt is reached with the mixture of primary amines derived from the fatty acids of tallow. By evaporation of the solvent, the desired product is obtained in the form of a viscous oil.

EXAMPLE VII

Preparation of the sodium salt of N²-[alkyl(copra)]-N-(cetyl)-N-(N',N'-diethylaminopropyl)asparagine This product is obtained by a process analogous to that described in Example VI. It takes the form of a viscous oil.

Examples VIII and IX illustrate the use of compounds of the invention in a hair dry composition.

EXAMPLE VIII

The following mixture is prepared:

| | |
|---|---|
| - sodium salt of N² [alkyl(allow)]-N-(dodecyl)-N-(N',N'-diethylamino-ethyl)asparagine | 5 g |
| - picramic acid | 0.5 g |
| - lactic acid, q.s. for | pH 6.5 |
| - water, q.s. for | 100 cc |

There is thus obtained a thick dyeing solution which when applied to the hair, imparts a glistening effect thereto, softens it and makes it easy to comb.

EXAMPLE IX

The following mixture is prepared:

| | |
|---|---|
| - nitroparaphenylenediamine | 1 g |
| - diethanolamine of copra fatty acids | 4 g |
| - the condensate of 1 mole of lauryl alcohol and 10 moles of ethylene oxide | 6 g |
| - sodium salt of N²-[alkyl(copra)]-N-(cetyl)-N-(N',N'-diethylaminoethyl)asparagine | 3 g |
| - acetic acid, q.s. for | pH 5.5 |
| - water q.s. for | 100 cc |

There is thus obtained a viscous dyeing solution which when applied to the hair, besides dyeing it, imparts to it a gloss and suppleness.

Other illustrative surface-active asparagine compounds having the formula I include:

1) 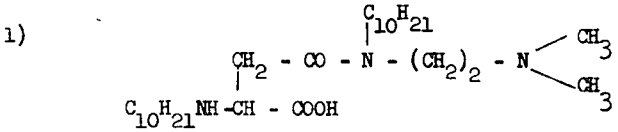

2) 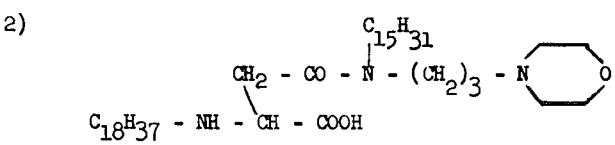

3) 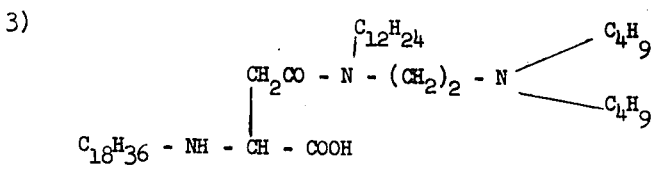

4)

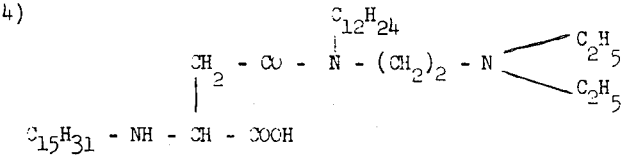

Illustrative other detergent or shampoo detergents that may be used in the detergent or shampoo compositions include sodium lauryl sulphate, sodium decyl benzene sulphonate, N-(sodium sulphoethyl)oleamide, sodium dioctyl sulphosuccinate, sodium lauryl sulphoacetate, etc.

Illustrative hair dyes that may be used in the hair dye compositions include 1,4-diethylolamine-3-nitrobenzene, 1-(β-ethylolamino)-2-amino-4-nitrobenzene, 1-hydroxy-2-amino-5-nitrobenzene, and direct dyes such as those shown in U.S. Pat. Nos. 2,983,651; 3,040,064; 3,049,393; 3,100,739, etc.

The compositions of this invention have preferably an acid pH.

What is claimed is:

1. A hair dye and softening composition comprising an effective amount of an asparagine compound having the formula:

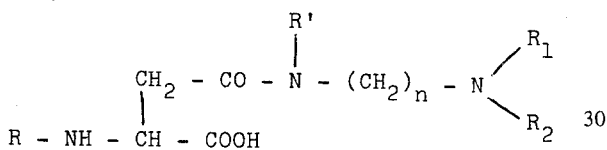

or its sodium, potassium, or ammonium salt, wherein R and R' are selected from the group consisting of alkyl having 10 to 18 carbon atoms and alkenyl having 10 to 18 carbon atoms;

$R_1$ and $R_2$ are lower alkyl or together with the nitrogen atom on which they are attached constitute morpholino;

and $n$ is an integer of 2 to 5, which has an acid pH, and a hair coloring amount of a hair dye.

2. The process of dyeing and softening live human hair comprising applying to the hair an effective amount of the composition of claim 1.

3. The hair dye composition of claim 1, in which said hair dye is a direct dye.

* * * * *

UNITED STATES PATENT OFFICE
CERTIFICATE OF CORRECTION

PATENT NO. : 3,891,385
DATED : June 24, 1975
INVENTOR(S) : GREGOIRE KALOPISSIS et al It is certified that error appears in the above-identified patent and that said Letters Patent are hereby corrected as shown below:

[30] Foreign Application Priority Data

January 17, 1964    France........960,742

Signed and Sealed this

*fourth* Day of *November 1975*

[SEAL]

*Attest:*

RUTH C. MASON
*Attesting Officer*

C. MARSHALL DANN
*Commissioner of Patents and Trademarks*